US012790018B2

(12) United States Patent
Jojic et al.

(10) Patent No.: US 12,790,018 B2
(45) Date of Patent: Nov. 10, 2026

(54) OVER-PRESSURE PROTECTION SYSTEM FOR AN AIRCRAFT INLINE IN THE AN OXYGEN-DEPLETED AIR DISTRIBUTION SYSTEM

(71) Applicant: The Boeing Company, Arlington, VA (US)

(72) Inventors: Ivana Jojic, Bellevue, WA (US); Andrew Theodore Johnson, Everett, WA (US); Timothy Andrew Johnson, Issaquah, WA (US); Royal Everett Boggs, Charleston, SC (US)

(73) Assignee: THE BOEING COMPANY, Arlington, VA (US)

( * ) Notice: Subject to any disclaimer, the term of this patent is extended or adjusted under 35 U.S.C. 154(b) by 278 days.

(21) Appl. No.: 18/430,795

(22) Filed: Feb. 2, 2024

(65) Prior Publication Data

US 2025/0250021 A1 Aug. 7, 2025

(51) Int. Cl.
*B64D 37/32* (2006.01)

(52) U.S. Cl.
CPC .................................... *B64D 37/32* (2013.01)

(58) Field of Classification Search
CPC ...................................................... B64B 37/32
USPC ........................................................ 220/88.3
See application file for complete search history.

(56) References Cited

U.S. PATENT DOCUMENTS

| | | | | |
|---|---|---|---|---|
| 2,417,212 | A | 3/1947 | Peterson | |
| 3,587,618 | A | 6/1971 | Kenyon | |
| 6,913,636 | B2 | 7/2005 | Defrancesco et al. | |
| 7,007,893 | B2 | 3/2006 | Loss et al. | |
| 7,081,153 | B2 | 7/2006 | Leigh et al. | |
| 7,152,635 | B2 | 12/2006 | Moravec et al. | |
| 7,191,983 | B2 | 3/2007 | Loss et al. | |
| 7,204,868 | B2 | 4/2007 | Snow, Jr. | |
| 10,479,521 | B2 | 11/2019 | Jojic et al. | |
| 2005/0115404 | A1 * | 6/2005 | Leigh | B64D 37/32 96/113 |

(Continued)

FOREIGN PATENT DOCUMENTS

| | | | | |
|---|---|---|---|---|
| EP | 4242113 | A1 | 9/2023 | |
| WO | WO-2016116898 | A1 * | 7/2016 | B64D 41/00 |

OTHER PUBLICATIONS

EP Search Report mailed Jun. 13, 2025 in re EP Application No. 25155176.8.

*Primary Examiner* — Orlando E Aviles
*Assistant Examiner* — Niki M Eloshway
(74) *Attorney, Agent, or Firm* — COATS & BENNETT, PLLC

(57) ABSTRACT

A flow regulation and protection system configured to be coupled in fluid communication with a supply line of an oxygen-depleted air distribution system that supplies oxygen-depleted air to a fuel tank of an aircraft. The flow regulation and protection system includes an OPP-FCV configured to be coupled in fluid communication with the supply line of the oxygen-depleted air distribution system at a point along the supply line upstream from the fuel tank. The OPP-FCV is selectively adjustable to regulate a flow of the oxygen-depleted air through the supply line and supplied to the fuel tank and to restrict or prevent the flow of the oxygen-depleted air along the supply line to prevent over pressurization of the fuel tank.

20 Claims, 11 Drawing Sheets

(56) References Cited

U.S. PATENT DOCUMENTS

| | | | | |
|---|---|---|---|---|
| 2009/0214900 | A1* | 8/2009 | Hoffjann | H01M 8/04156<br>429/413 |
| 2012/0193479 | A1* | 8/2012 | Roscoe | B64D 37/32<br>244/135 R |
| 2014/0238501 | A1* | 8/2014 | Tichborne | B64D 37/32<br>137/12 |
| 2014/0345700 | A1 | 11/2014 | Surawski et al. | |
| 2016/0176535 | A1* | 6/2016 | Family | A62C 99/0018<br>701/3 |
| 2020/0261842 | A1* | 8/2020 | Yuan | B64D 13/06 |
| 2020/0331623 | A1* | 10/2020 | Waddleton | F16L 9/18 |
| 2020/0361760 | A1* | 11/2020 | Steele | A45F 3/166 |
| 2020/0406171 | A1* | 12/2020 | Muzik | F16K 31/363 |
| 2021/0031938 | A1 | 2/2021 | Cordatos et al. | |
| 2023/0286669 | A1 | 9/2023 | Jojic et al. | |
| 2024/0207778 | A1* | 6/2024 | Surawski | B01D 53/22 |

* cited by examiner

OVER-PRESSURE PROTECTION SYSTEM FOR AN AIRCRAFT INLINE IN THE AN OXYGEN-DEPLETED AIR DISTRIBUTION SYSTEM

TECHNOLOGICAL FIELD

The present disclosure relates generally to the field of fueling systems for an aircraft and, more specifically, to an over-pressure protection-flow control valve (OPP-FCV) that controls an amount of oxygen-depleted air that is supplied to the one or more fuel tanks of an aircraft.

BACKGROUND

Aircrafts are equipped with systems to supply an inerting gas, such as oxygen-depleted air, to the ullage (i.e., the portion of a tank above the liquid) of fuel tanks to prevent the tanks from combusting. However, failures in the supply system, fuel system, or other aspects of the aircraft can over-pressurize the fuel tanks. Over-pressurization of a fuel tank can lead to loss of structural integrity.

There is a need for a system that provides for the oxygen-depleted air to be supplied to the fuel tanks to reduce flammability of fuel tanks. The system should also be configured to prevent over-pressurization of the fuel tanks.

SUMMARY

One aspect is directed to a flow regulation and protection system configured to be coupled in fluid communication with a supply line of an oxygen-depleted air distribution system that supplies oxygen-depleted air to a fuel tank of an aircraft. The flow regulation and protection system comprises a OPP-FCV configured to be coupled in fluid communication with the supply line of the oxygen-depleted air distribution system at a point along the supply line upstream from the fuel tank. The OPP-FCV is selectively adjustable to regulate a flow of the oxygen-depleted air through the supply line and supplied to the fuel tank and to restrict or prevent the flow of the oxygen-depleted air along the supply line to prevent over pressurization of the fuel tank.

In another aspect, the OPP-FCV is configured to control the flow of the oxygen-depleted air in the supply line without venting the oxygen-depleted air from the supply line.

In another aspect, the OPP-FCV is configured to regulate the flow of the oxygen-depleted air based on a difference between an atmospheric pressure and a supply line pressure in the Oxygen-Depleted Air Distribution System (ODADS, also referred to as Nitrogen Enriched Air Distribution System (NEADS)) upstream from the oxygen-depleted air deposition into a fuel tank.

In another aspect, a pressure sense line is configured to be coupled in fluid communication with the supply line at a point between the OPP-FCV and the fuel tank with the pressure sense line being coupled in fluid communication with the OPP-FCV such that the OPP-FCV is configured to sense the supply line pressure through the pressure sense line.

In another aspect, the OPP-FCV comprises an integrated pressure sense line that is configured to be coupled in fluid communication with the supply line and with the OPP-FCV configured to sense the supply line pressure through the integrated pressure sense line.

In another aspect, one or more atmospheric pressure sensing elements are configured to sense an atmospheric pressure; one or more line pressure sensing elements are configured to sense a pressure within the supply line; and one or more mass flow sensing elements are configured to sense a flow rate of the oxygen-depleted air within the supply line.

In another aspect, a controller comprising processing circuitry is configured to receive inputs comprising the supply line pressure at one or more points along the supply line, an atmospheric pressure, a mass flow rate of the oxygen-depleted air at one or more points along the supply line, and an operating state and relevant parameters of the aircraft and Flammability Reduction System (FRS), with the controller configured to adjust the OPP-FCV based on the inputs.

In another aspect, the controller is configured to receive one or more of the inputs from the aircraft through a communications bus of the aircraft.

In another aspect, the controller is configured to perform testing of the system when the aircraft is in one of a plurality of predetermined operating states.

One aspect is directed to a flow regulation and protection system configured to be coupled in fluid communication with a supply line of an oxygen-depleted air distribution system that supplies oxygen-depleted air to a fuel tank of an aircraft. The flow regulation and protection system comprises a OPP-FCV configured to be coupled in fluid communication with the supply line at a point upstream from the oxygen-depleted air deposition into a fuel tank. A line pressure sensing element is located in the supply line downstream from the OPP-FCV. A controller comprises processing circuitry configured to determine inputs comprising of the supply line pressure sensed by the line pressure sensing element at one or more points along the supply line, an atmospheric pressure, a mass flow rate of the oxygen-depleted air at one or more points along the supply line, and an operating state of the aircraft. The controller is configured to adjust the valving unit based on the inputs to control the flow of the oxygen-depleted air through the supply line and to prevent over pressurization of the fuel tank.

In another aspect, the OPP-FCV comprises a body with the controller integrated in the body.

In another aspect, a pressure sense line is integrated with the body and configured to be coupled in fluid communication with the supply line with the controller configured to sense the supply line pressure at the OPP-FCV through the integrated pressure sense line.

In another aspect, one or more line pressure sensing elements are mounted to the body.

In another aspect, the controller is configured to determine a difference between the supply line pressure and the atmospheric pressure.

In another aspect, the fuel tank is a first fuel tank and the OPP-FCV is configured to be mounted along the supply line upstream from a junction of the supply line that supplies the oxygen-depleted air to the fuel tank and one or more additional fuel tanks and wherein the controller is configured to adjust the valving unit based on the inputs to control the flow of the oxygen-depleted air to each of the fuel tanks and to prevent over pressurization of each of the fuel tanks.

In another aspect, the controller is configured to receive one or more of the inputs from the aircraft through a communications bus of the aircraft and compute the mass flow rate and an overpressure set point based on the one or more inputs.

In another aspect, the controller is configured to perform testing of the OPP-FCV and the system when the aircraft is in one of a plurality of predetermined operating states and report tests through a communications bus to the aircraft.

One aspect is directed to a method of regulating a flow of oxygen-depleted air from a oxygen-depleted air distribution system to a fuel tank of an aircraft and to prevent over-pressurizing the fuel tank. The method comprises: coupling a OPP-FCV in fluid communication with a supply line of the NEADS at a point along the supply line that is upstream from the oxygen-depleted air distribution system branching into different fuel tanks; operating the OPP-FCV and controlling a flow rate of the oxygen-depleted air moving along the supply line; and operating the OPP-FCV and preventing a pressure within the fuel tank from exceeding an over-pressure protection limit.

In another aspect, the method further comprises operating the OPP-FCV without venting the oxygen-depleted air.

In another aspect, the method further comprises closing the OPP-FCV and preventing the oxygen-depleted air from passing along the supply line.

The features, functions and advantages that have been discussed can be achieved independently in various aspects or may be combined in yet other aspects, further details of which can be seen with reference to the following description and the drawings.

DETAILED DESCRIPTION

Figure 1:
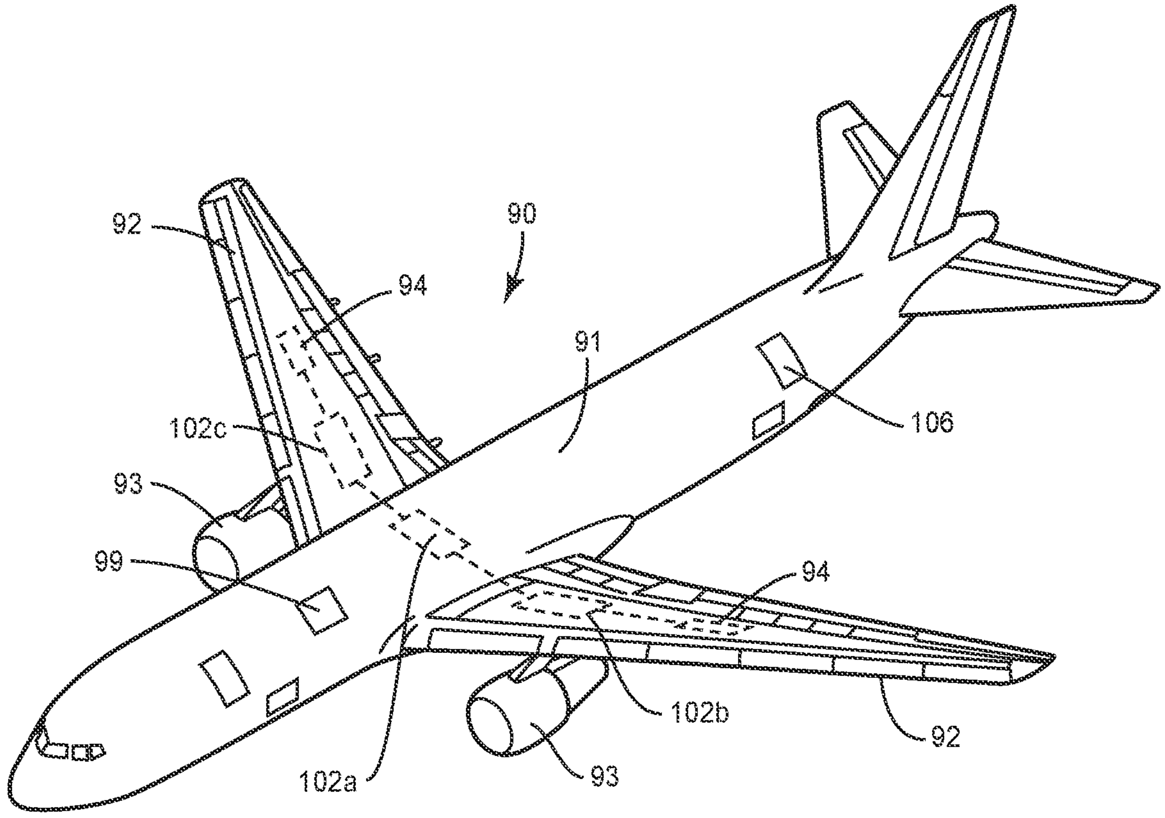
FIG. 1 is an isometric view of an aircraft that includes fuel tanks.

FIG. 1 illustrates one example of an aircraft 90 configured to transport passengers and/or cargo. The aircraft 90 generally includes a fuselage 91 and wings 92. One or more engines 93 propel the aircraft 90 during flight. One or more fuel tanks 102 are configured to supply fuel to the engines 93 or to the Auxiliary Power Unit (APU). In some examples, the fuel tanks 102 are aligned with the wings 92 and include a center wing tank 102*a* partially contained within the fuselage 91 and a pair of main wing fuel tanks 102*b*, 102*c* located in the wings 92. Surge tanks 94 are connected to one or more of the fuel tanks 102. In some examples as illustrated in FIG. 1, the surge tanks 94 are located along the wings 92 outboard from the main wing fuel tanks 102. Other examples include different numbers and/or positioning of the fuel tanks 102 and surge tanks 94.

The fuel tanks 102 include the fuel and a space usually positioned above the fuel referred to as the ullage. The amount of ullage can vary depending upon the amount of fuel relative to the size of the tank. Further, the ullage increases during a flight as the fuel is used by the engines 93.

The aircraft 90 is equipped with a vent system designed to facilitate equalizing the pressure in the fuel tanks 102. During a climb phase as the aircraft's altitude increases, atmospheric pressure decreases and the air above the fuel within the fuel tanks 102 is directed through the vent system into the surge tanks 94 and vented overboard (e.g., through a vent scoop, etc.). Similarly, in descent, the vent system enables inflow of outside air to enable pressure equalization of the fuel tanks 102 as the atmospheric pressure increases.

The aircraft 90 is equipped with a flammability reduction system (FRS) 99 that supplies oxygen-depleted air to the fuel tanks 102. The oxygen-depleted air replaces the existing air and reduces the concentration of oxygen in the fuel tanks 102 to prevent explosions. The type of oxygen-depleted air supplied to the fuel tanks 102 can vary. Examples include but are not limited to nitrogen, argon, and carbon dioxide.

In some examples, the FRS 99 is configured to process air from the environment. The air which initially includes a 21% concentration of oxygen is processed to produce the oxygen-depleted air with a lower concentration of oxygen. The air with a lower concentration of oxygen is then supplied to the fuel tanks 102.

Figure 2:
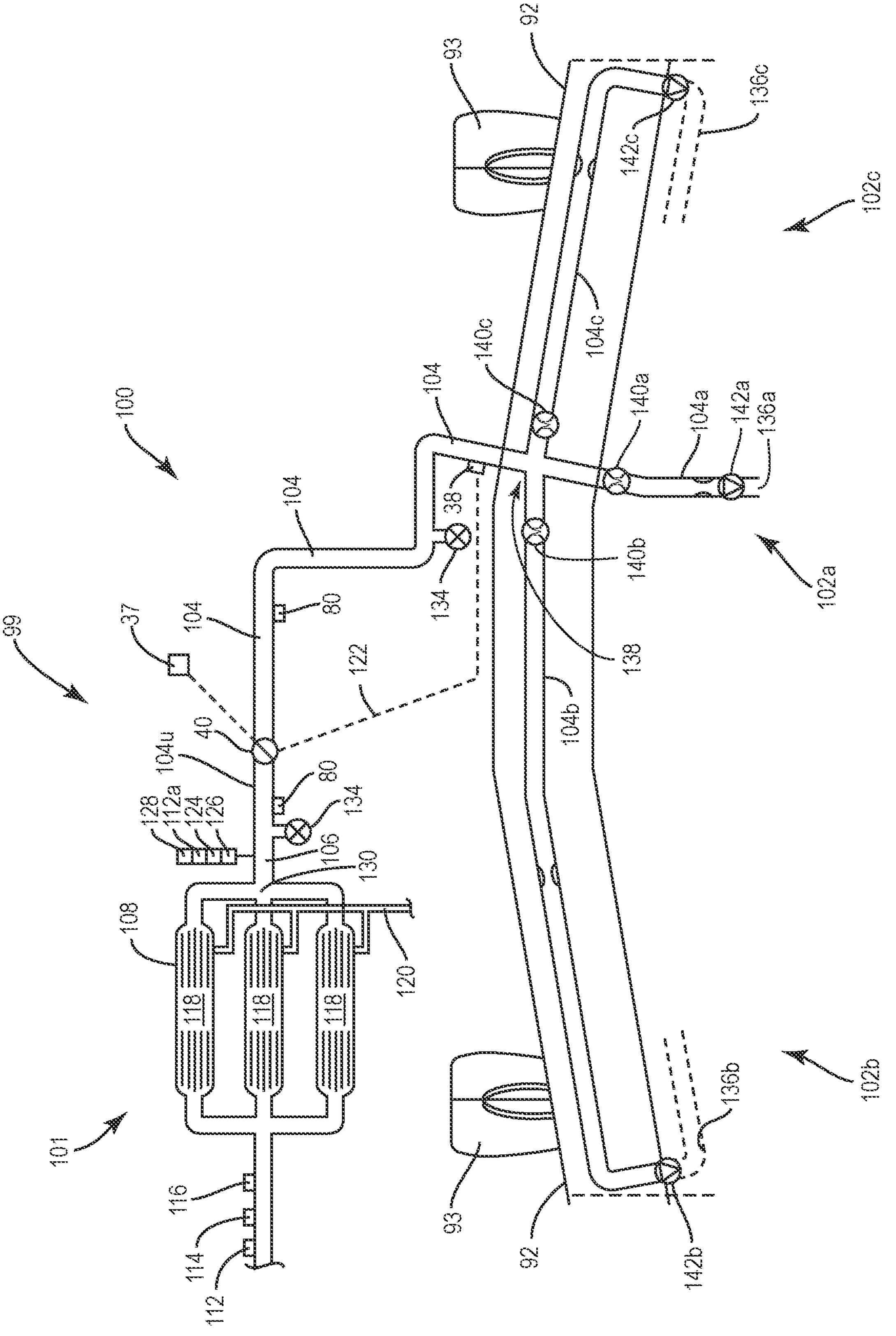
FIG. 2 is a schematic diagram of an oxygen-depleted air distribution system for fuel tanks of an OPP-FCV positioned along a supply line.

FIG. 2 illustrates an aircraft 90 equipped with an FRS 99 that includes a nitrogen generation system (NGS) 101 and an oxygen-depleted air distribution system (ODADS) 100. In examples discussed below, the FRS 99 supplies oxygen-depleted air through the ODADS 100. However, the FRS 99 can provide various different types of oxygen-depleted air.

The ODADS 100 of FIG. 2 includes a supply line 104 that has an inlet 106 where the oxygen-depleted air is received from the NGS 101. The ODADS 100 supplies the oxygen-depleted air to the fuel tanks 102 to displace oxygen in the ullage. This reduces the concentration of oxygen in the fuel tanks 102 to prevent explosions.

The NGS 101 includes a gas separation module (GSM) assembly 108 coupled in fluid communication with a gas source (not shown; e.g., ambient air, gas supplied from a heat exchanger, gas supplied from a compressor, etc.) for receiving a flow of gas (e.g., air) having a nitrogen component and an oxygen component. In some examples, a system shut-off OPP-FCV (not shown) is operatively connected between the GSM assembly 108 and the gas source for selectively controlling operation of the NGS 101, the ODADS 100, and/or the like (e.g., for selectively allowing gas to flow through the inlet 106 and into the supply line 104 of the ODADS 100, etc.).

In some examples, a pressure sensing element 112, a flow rate sensing element 114, and/or a temperature sensing element 116 is operatively connected upstream from the GSM assembly 108 to measure a respective pressure, flow rate, and/or temperature of gas supplied to the GSM assembly 108.

The GSM assembly 108 includes one or more gas separation modules 118 that separate the received gas flow into an oxygen-depleted air flow and an oxygen-enriched gas flow. The oxygen-enriched gas flow is discharged from the GSM assembly 108 through an outlet 120 as waste gas, or alternatively, for use providing breathable air to passenger and/or flight crew compartments (not shown).

In some examples, one or more pressure sensing elements 112*a*, one or more flow rate sensing elements 124, one or more oxygen sensing elements 126, and/or one or more temperature sensing elements 128 are operatively connected downstream from an outlet 130 of the GSM assembly 108 to measure a respective pressure, flow rate, oxygen amount, and/or temperature of the oxygen-depleted air flow discharged from the GSM assembly 108.

The inlet 106 of the ODADS 100 is coupled in fluid communication with the outlet 130 of the GSM assembly 108 for receiving a oxygen-depleted air flow from the GSM assembly 108 into the supply line 104 of the ODADS 100.

In some examples, the ODADS 100 includes one or more ground connection ports 134 operatively connected to the supply line 104 or 104*a*. The connection ports 134 can provide for various functions including but not limited to one or more of: (1) to allow for testing for, and/or drainage of, fuel that has migrated from the fuel tanks 102 into the supply line 104; (2) to allow the withdrawal of oxygen-depleted air from the oxygen-depleted air flow generated by the upstream system for generating oxygen-depleted air (NGS as an example) 100; and/or (3) for introducing oxygen-depleted air from a oxygen-depleted gas source (not shown) external to the aircraft to the fuel tanks 102 instead of, or in addition to, the oxygen-depleted air flow generated by the GSM assembly 108 (e.g., to enable the ODADS 100 to operate without electrical power when supplied with compressed gas from the pre-conditioned gas-source, etc.).

In some examples, the one or more connection ports 134 enable supplying oxygen-depleted air from an outside source. In one specific example, tanks of oxygen-depleted air are connected to one or more of the connections ports 134 while the aircraft 90 is on the ground. For example, the outside sources supply the oxygen-depleted air at a time prior to sufficient generation of oxygen-depleted air by the aircraft 90 (e.g., prior to producing an adequate amount of oxygen-depleted air by a system such as the NGS 101). In one specific example, this occurs when the aircraft 90 is initially powered and the NGS 101 is initiated and prior to generating a full output capacity of oxygen-depleted air.

In some examples, the ODADS 100 includes a single connection port 134 positioned upstream from the OPP-FCV 40. This positioning provides for the OPP-FCV 40 to control the flow of oxygen-depleted air and prevent overpressurization of the fuel tanks 102.

The supply line 104 of the ODADS 100 includes one or more outlets 136 coupled in fluid communication with the fuel tanks 102. The supply line 104 delivers the oxygen-depleted air generated by the GSM assembly 108 to the fuel tanks 102 through the one or more outlets 136. In some examples as illustrated in FIG. 2, the ODADS 100 serves the center fuel tank 102*a* and both main wing fuel tanks 102*b* and 102*c*. The supply line 104 branches off at a junction 138 into three branches 104*a*, 104*b*, and 104*c* having three outlets 136*a*, 136*b*, and 136*c* that are coupled in fluid communication with the respective fuel tanks 102*a*, 102*b*, and 102*c*. In other examples, the ODADS 100 serves a different number of fuel tanks 102 (e.g., one of the fuel tanks 102, two of the fuel tanks 102, etc.) such that the supply line 104 includes a different number of branches (e.g., a single branch, two branches, etc.) and a different number of outlets 136 (e.g., one of the one or more outlets 136, two of the one or more outlets 136, etc.).

Each branch 104*a*, 104*b*, and 104*c* of the supply line 104 includes a respective isolation Valves 140*a*, 140*b*, and 140*c* to control the flow of oxygen-depleted air into the respective fuel tank 102*a*, 102*b*, and 102*c*. In some implementations, an isolation valve 140 is a two-position valve having an open position allowing a first (e.g., higher, etc.) flow rate of the oxygen-depleted air into the corresponding one of the fuel tanks 102, and a closed position allowing a second (e.g., lower, zero, etc.) flow rate of the oxygen-depleted air into the corresponding one of the fuel tanks 102. In some implementations, an isolation valve 140 has a multiplicity of positions producing any number and/or combination of flow rates of the oxygen-depleted air flow into the corresponding one of the fuel tanks 102. In some examples, one or more of the branches 104*a*, 104*b*, and/or 104*c* of the supply line 104 includes a check valve 142.

During flight, operational conditions (e.g., maneuvers, etc.) and/or failures (e.g., failures in the ODADS 100, NGS 101, the fuel system, other systems, etc.) could result in the fuel tanks 102 becoming over-pressurized which could lead to loss of structural integrity. Pressure relief valves that are located in the surge tanks 94 open when the surge tank pressure exceeds the atmospheric pressure by a predetermined threshold. However, such pressure relief valves may not relieve the pressure in certain situations. For example, when the venting is inhibited between the fuel tank 102 and surge tank 94, when a vent climb port is covered, and when a float valve/dive port fails and/or is covered. Other situations in which venting is inhibited include but are not limited to during takeoff/climb and in negative "g" situations.

In aircraft 90 with a center wing fuel tank 102*a* and main wing fuel tanks 102*b*, 102*c*, overpressure conditions exist for each of the fuel tanks 102.

The present application discloses a flow regulation and protection system 20 (hereinafter, system 20) to provide for safe operation of the fuel tanks 102. The system 20 includes a OPP-FCV 40 that can be adjusted to control the flow of the oxygen-depleted air through the supply line 104 (i.e., inerting) to the fuel tanks 102. The system 20 can also severely restrict or even close the OPP-FCV 40 to provide overpressure protection that reduces or stops the flow of the oxygen-depleted air. The system 20 performs these functions without venting gases from the supply line 104. Operation of the system 20 is based on the pressure in the supply line 104 being related to the pressure within the fuel tanks 102.

In the example illustrated in FIG. 2, the OPP-FCV 40 is operatively connected to (e.g., coupled in fluid communication with) the supply line 104. The OPP-FCV 40 controls a flow rate of the oxygen-depleted air received from the GSM assembly 108 into the supply line 104 and supplied to the fuel tanks 102. The adjustment can vary between a closed position to prevent the flow of the oxygen-depleted air to the fuel tanks 102 to one or more open positions to provide for different flow rates of the oxygen-depleted air along the supply line 104. The OPP-FCV 40 may be of a variety of different types including but not limited to a ball valves, various other rotary valving units such as butterfly and plug OPP-FCV valves, and linear OPP-FCV valves such as globe OPP-FCV valves or poppet OPP-FCV valves used with an actuator with a linear output.

The OPP-FCV 40 is located along the supply line 104 downstream from the inlet 106. In some examples as illustrated in FIG. 2, the OPP-FCV 40 is positioned upstream of the junction 138. In aircraft 90 with multiple fuel tanks 102 that are each interconnected through the ODADS 100, placement upstream of the junction 138 allows for a single OPP-FCV 40 to control the flow of oxygen-depleted air and to detect an overpressure situation in the fuel tanks 102.

The system 20 is configured to determine the pressure within the supply line 104. In some examples, the system 20 includes a pressure sense line 122 that is operatively connected between the supply line 104 and the OPP-FCV 40. A first end of the pressure sense line 122 is operatively connected to the supply line 104 and a second end is operatively connected to the OPP-FCV 40.

In some examples, the pressure sense line 122 provides an electrical and/or mechanical signal. For example, the first end includes a pressure sensing element 38 (e.g., a digital pressure sensing element, an analog pressure sensing element, etc.) that is configured to read the pressure within the supply line 104 such that the OPP-FCV 40 receives an electrical or optical signal from the pressure sense line 122 that indicates the pressure read within the supply line 104. In some examples, multiple pressure signals may be provided.

In some examples, the pressure sense line 122 is a pneumatic line that is operatively connected between the supply line 104 and the OPP-FCV 40. The fluid communication provided by the pressure sense line 122 enables the OPP-FCV 40 to mechanically sense the pressure within the supply line 104 through the pressure sense line 122. Accordingly, the pressure sense line 122 provides a fluid path between the supply line 104 and the OPP-FCV 40.

As shown in FIG. 2, the first end of the pressure sense line 122 is operatively connected to the supply line 104 upstream from the junction 138 (and downstream from the OPP-FCV 40). Accordingly, the OPP-FCV 40 is configured to sense the pressure within the supply line 104 at a location along the supply line 104 that is upstream from the outlets 136.

The pressure sense line 122 is connected to the supply line 104 at various positions. In some examples as illustrated in FIG. 2, the pressure sense line 122 is located upstream from the one or more outlets 136 of the supply line 104. The location along the supply line 104 may be selected to facilitate operation of the system 20. For example, the pressure sense line 122 may be operatively connected to the supply line 104 at a location that is as close as possible to the one or more outlets 136 (i.e., the fuel tank penetration location) to minimize a pressure differential that is accounted for between the fuel tank(s) 102 and the OPP-FCV 40. Moreover, and for example, the location along the supply line 104 may be selected as upstream from, but as close as possible to, the junction 138 at which the supply line 104 branches off to different fuel tanks 102. Locating the pressure sense line 122 upstream from a junction at which the supply line 104 branches off to different fuel tanks 102 enables the system 20 to serve a ODADS 100 that serves more than one fuel tank 102. For example, locating the pressure sense line 122 upstream from a junction at which the supply line 104 branches off to different ones of the fuel tanks 102 enables the system 20 to detect an overpressure scenario in any and all of the fuel tanks 102 that are served by the ODADS 100. Additionally or alternatively, one or more of the branches of the supply line 104 includes a dedicated system downstream from the junction 138.

Figure 3:
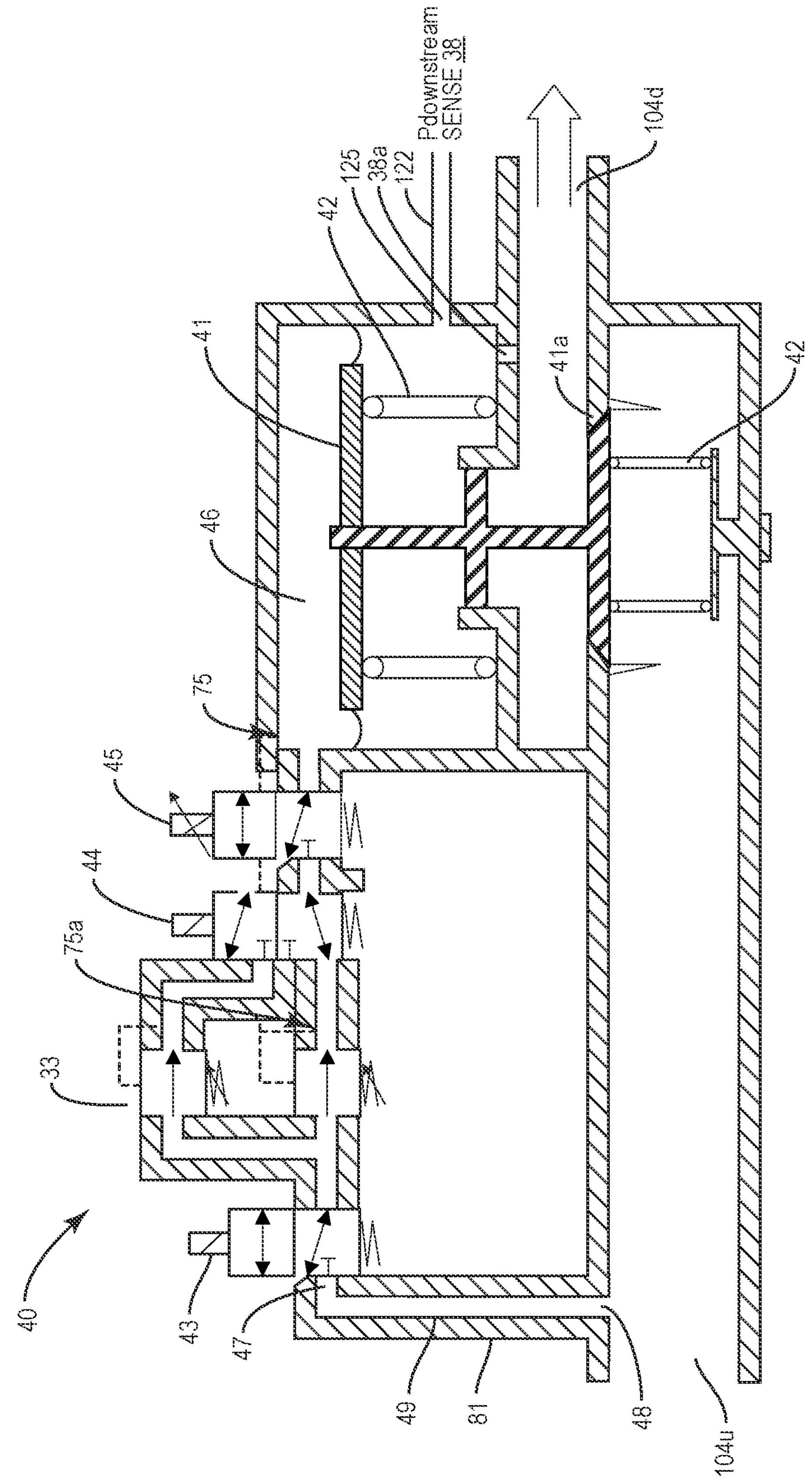
FIG. 3 is a schematic diagram of pneumatic OPP-FCV configured to control the flow of oxygen-depleted air and prevent overpressurization of the fuel tanks.

In some examples, the OPP-FCV 40 includes an integrated actuation pressure sense line within the body 81 of the OPP-FCV 40. For example, FIG. 3 illustrates a OPP-FCV valve 40 that includes a pressure sense line 49 that is integrated into the body 81. The pressure sense line 49 includes a line end portion 48 that is configured to be coupled in fluid communication with the supply line 104. Accordingly, the pressure sense line 49 provides a fluid path between the supply line 104*u* (at the location of the first end) and a pressure sense inlet 47 of the OPP-FCV 40. The fluid communication provided by the integrated pressure sense line 49 enables the OPP-FCV 40 to mechanically sense the pressure upstream of the OPP-FCV as an actuation pressure through the pneumatic pressure sense line 49 to be used as actuation pressure when the valve is energized (during the system testing and when over-pressure protection function is not needed).

As the pressure sense line 49 is integrated into the OPP-FCV 40 as shown in FIG. 3, the line end portion 48 of the pressure sense line 49 is operatively connected to the supply line 104 at the location of the OPP-FCV 40. Accordingly, the OPP-FCV 40 is configured to sense the pressure within the supply line 104 at the location along the supply line 104 of the OPP-FCV 40. The integrated pressure sense line 49 is suitable for implementations when a pressure difference from the fuel tanks 102 is acceptable, and is active when the OPP-FCV is energized.

The system 20 is further configured to determine an atmospheric pressure reference. The atmospheric pressure may be sensed by one or more sensing elements 37. In some examples, sensing elements 37 are associated with the system 20 and signal the information directly. Additionally or alternatively, the sensing elements 37 are associated with one or more other systems on the aircraft 90 and signal to the information to the system 20 through a communications bus.

The system 20 is further configured to determine the mass flow of oxygen-depleted air in the supply line 104. In some examples, one or more mass flow sensing elements 80 are positioned along the supply line 104 located both upstream and downstream from the OPP-FCV 40. In some examples, the mass flow sensing elements 80 are positioned along a section of the supply line 104 that is straight to be positioned away from areas of flow disturbance which could interfere with accurate sensing. Various types of mass flow sensing elements 80 may be employed to sense the flow rate within the supply line 104. Examples include but are not limited to an electrical sensing element, a mechanical sensing element, a digital sensing element, and an analog sensing element.

In some examples, the mass flow rate of the oxygen-depleted air is determined by one or more other systems on the aircraft 90. The information is sent to system 20 through a communications bus.

In some examples, the system 20 includes a controller 150 configured to monitor and control the operation of the OPP-FCV 40 to control the flow of the oxygen-depleted air through the supply line 104. In some examples, the controller 150 is positioned within the body 81 of the OPP-FCV 40. In other examples, the controller 150 is positioned remotely from the OPP-FCV 40. In some examples, the controller 150 is independent and configured to just control the operation of the OPP-FCV 40. In other examples, the controller 150 is embedded with circuitry associated with one or more other systems of the aircraft 90 that performs one or more other operational aspects (e.g., fire suppression system controller).

Figure 4:
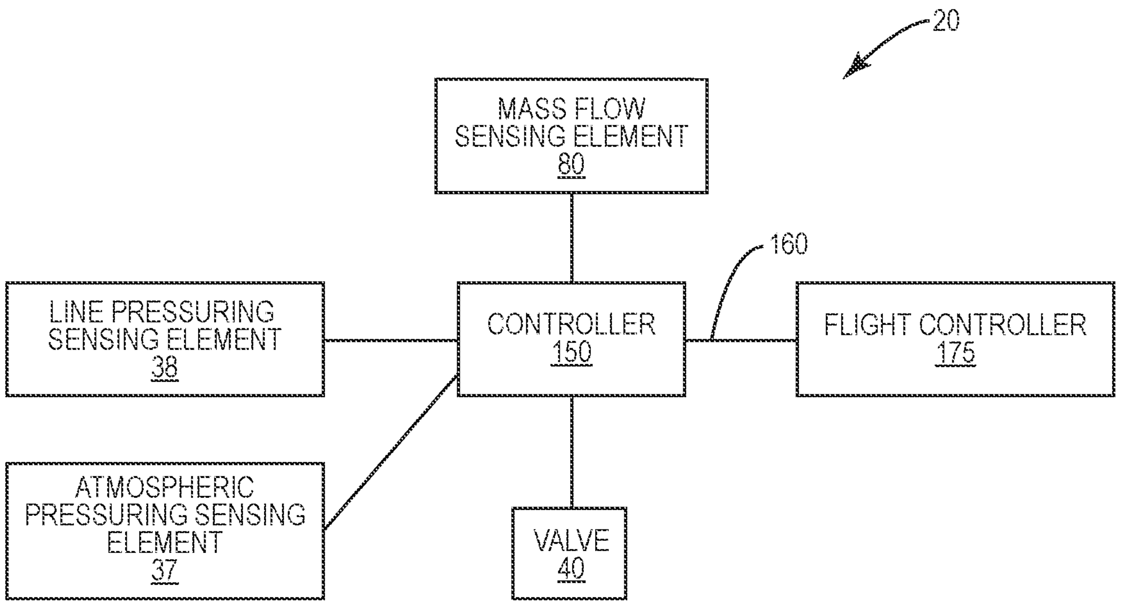
FIG. 4 is a schematic diagram of a flow regulation and protection system to control the flow of oxygen-depleted air and prevent over pressurization of the fuel tanks.

FIG. 4 schematically illustrates a controller 150 that operates a OPP-FCV 40. The controller 150 is operatively connected to the OPP-FCV 40 and configured to control the position of a valving unit that controls the flow of oxygen-depleted air along the supply line 104. The controller 150 is further configured to receive signals from the one or more atmospheric pressure sensing elements 37, line pressure sensing elements 38, and mass flow sensing elements 80. The controller 150 is communicatively connected through one or more buses 160 to a flight controller 175 or other like system to determine one or more of the supply line pressure, atmospheric pressure, and mass flow rate. Additionally or alternatively, the one or more other systems can also provide other flight information such as but not limited to the stage of the flight (e.g., take-off, ascent, cruising, descent, landing, ground), altitude, fuel quantity, weight off wheels, and various system parameters.

In some examples, to limit the number of cases that need to be considered for overpressure analysis, aircraft signals are used to limit the FRS operation. Limiting FRS operation based on some of the aircraft maneuvers that are uncommon in normal operation but could drive the overpressure requirements could also increase the allowable for the OPP-FCV design and make the architecture less constrained. These signals include but are not limited to the following:

Pitch and/or roll conditions that are outside of the normal envelope

Acceleration outside of the normal envelope

Max sustained climb

Engine out in air

Side Slip-effective acceleration

In some examples due to the ability of the system 20 to mitigate overpressure, FRS operation is not limited in scenarios otherwise sensitive to a number of fueling system and ODADS failures. These scenarios include, but are not limited to the following:

Dual vent transition

Main tank Climb port covered

CWT Climb Port covered

Full rudder steady heading

Un-commanded fuel transfer

The system 20 is configured to be tested periodically to determine the operational condition. The testing detects faults which could lead to issues with the fuel system. In some examples, the testing occurs in steady altitude conditions with steady supply pressure and temperature and fixed isolation OPP-FCV 140 configuration. Test entry is confirmed based on sufficient air supply pressure and temperature being available from main engine bleed, APU, or ground supply.

In some examples, the optimum time for the test is during conditions when there is no overpressure threat (such as when the climb port in the main tanks uncovered) because it simplifies the overpressure analysis fault tree as well (otherwise the fault tree has to account for failures of components during the BIT test as well). In some examples, a test is performed once a flight cycle, where the cycle includes flight time and ground time before or after landing. The actual frequency would be determined by an overpressure fault tree.

The system 20 is further configured to perform built-in test (BIT) procedures to detect faults within the system 20. For example, a BIT is performed to determine whether the OPP-FCV 40 has failed open or failed closed. Specifically, the OPP-FCV 40 is set to the closed position and the isolation valves 140 are open. This configuration should prevent the flow of oxygen-depleted air to the fuel tanks 102. If mass flow upstream (at 114 or 124, for example) of valve 40 and perceptible mass flow downstream (at 80) of the OPP-FCV 40, or pressure (at 38 or 38*a*, for example) above measure at the atmospheric pressure sensing element 37 when the OPP-FCV 40 is commanded closed, the OPP-FCV 40 has failed open. Upon a determination that the OPP-FCV 40 has failed open, a fault is determined and a message is sent (e.g., to the flight controller 175) indicating that the system 20 is in degraded mode. In some examples, the FRS 99 of the aircraft 90 is shut down and a corresponding message sent to the flight controller 175 and/or flight deck.

If there is no mass flow upstream or downstream from the OPP-FCV 40 when the OPP-FCV 40 should be open during a BIT procedure or normal operation, the OPP-FCV 40 has failed closed. Upon a determination that the OPP-FCV 40 has failed closed, a fault is determined and the FRS 99 may be reduced or shut down.

In some examples, a BIT procedure tests the pressure-limiting regulation ability of the OPP-FCV 40. First, the isolation valves 140 are mostly closed to limit the flow of oxygen-depleted air to the fuel tanks 102 while allowing the pressure in supply line 104 as sensed by line pressure sensing element 38 or 38*a* to rise faster as flow is increased than in normal operation. The flow rate of the oxygen-depleted air in the ODADS 100 is gradually increased to further increase ODADS pressure where the OPP-FCV 40 regulates. Note that this test can incorporate failed open/closed with mass flow comparison without monitoring pressure (similar to the above described open/closed test but with gradual increase of the mass flow). As the flow increases, so does the pressure in the supply line 104, and when the pressure difference between the supply line 104 and the ambient pressure is sufficiently high, the OPP-FCV 40 will switch smoothly from flow regulation to regulating pressure. When the OPP-FCV 40 is regulating pressure, the pressure difference is maintained within tolerance, which is a distinguishing feature used in the BIT to detect when the OPP-FCV 40 is regulating overpressure when necessary.

The BIT further includes monitoring the pressure upstream of the OPP-FCV 40 (e.g., using an upstream pressure sensing element 112*a*, etc.) and the pressure difference from the ambient pressure signal (pressure at altitude). Correlation between the flow rate and the start and stop of the regulation abilities are used to determine health of the OPP-FCV 40 and system 20 for flow regulation.

In some examples the testing does not require the pressure at altitude to be exactly the same as the pressure acting on the OPP-FCV 40 from the fairing penetration, but rather a correlation between the pressures. In some examples, the BIT does not test for an absolute difference, but the change in slope as both the absolute difference and the change of slope are used in prognostics and health monitoring to recognize when the OPP-FCV 40 may be exhibiting wear.

In some examples in which the system 20 only includes one mass flow sensing element 80, BIT procedures are performed using one or more threshold flow rates instead of the difference between the flow rates of different mass flow sensing elements.

During operation, the controller 150 is configured to sense the pressure within the fuel tanks 102 relative to atmospheric pressure and adjust the flow of oxygen-depleted air along the supply line 104 accordingly. The operation of the protection system 20 is based on the pressure in the supply line 104 being related to the pressure within the fuel tanks 102 (e.g., tank pressure+supply line). The pressure difference between the sensed pressure and the atmospheric reference pressure is the proxy for the difference that is in the fuel tanks 102. Accordingly, the protection system 20 is configured to sense the pressure within the supply line 104 and adjust the flow of oxygen-depleted air based on the pressure sensed within the supply line 104.

Figure 5:
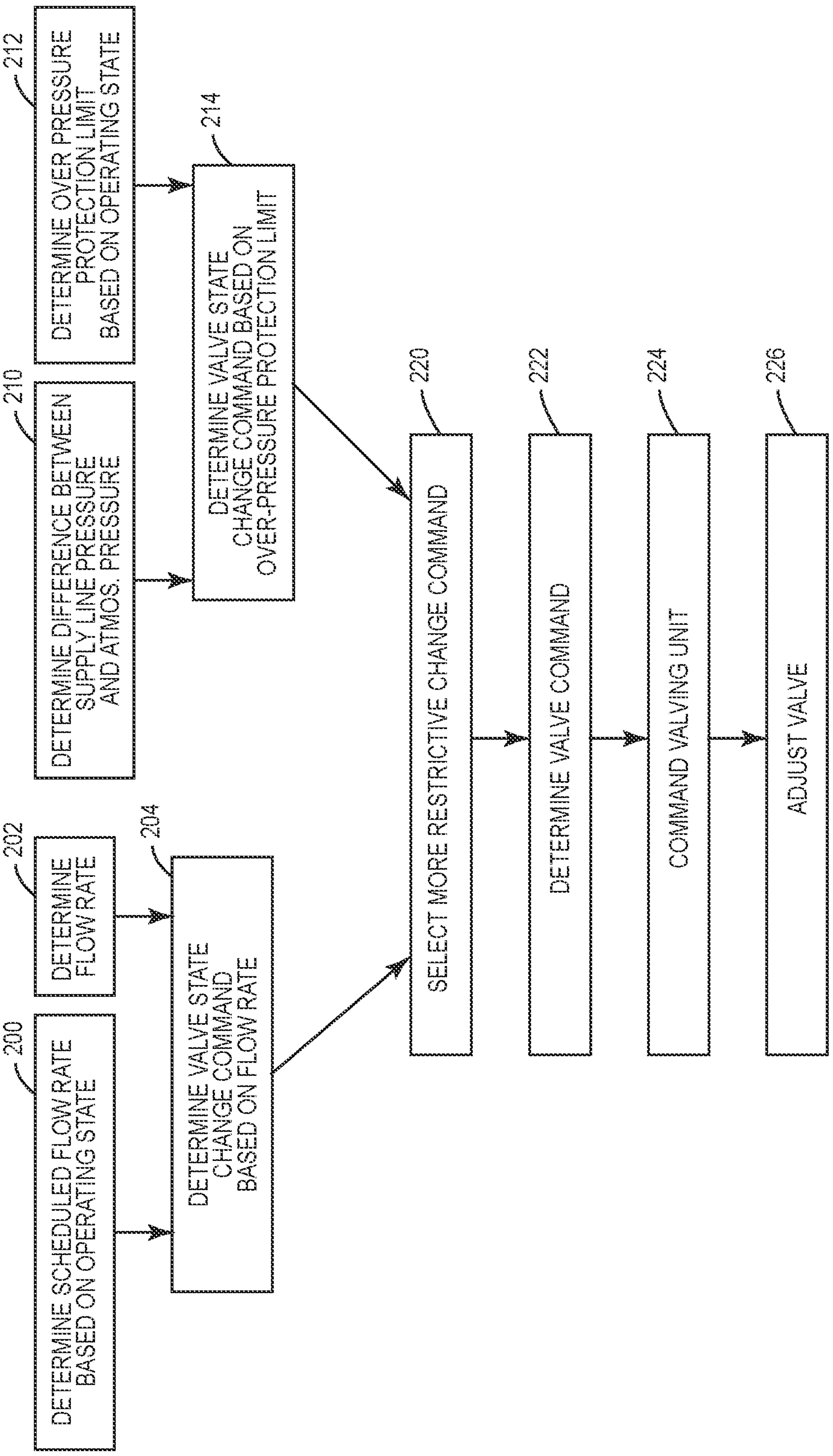
FIG. 5 is a flowchart diagram of a method of operating a system to control the flow of oxygen-depleted air and prevent over pressurization of the fuel tanks.

FIG. 5 illustrates a method of controlling a OPP-FCV 40 to provide for two separate functions: provide flow control of oxygen-depleted air to the fuel tanks 102; and providing over-pressure protection for the fuel tanks 102.

A scheduled flow rate of the oxygen-depleted air is determined based on the operating state of the aircraft 90 (block 200). In some examples, the operating state is received through a communications bus 160 from one or more other systems of the aircraft 90. The actual flow rate of the oxygen-depleted air along the supply line 104 is determined (e.g., from a mass flow sensor) (block 202). A OPP-FCV state change command is determined based on a comparison of the determined and actual flow rates (block 204).

A difference is determined between the pressure in the supply line 104 and an atmospheric pressure (e.g., from two or more pressure sensors) (block 210). An over-pressure protection limit is determined for the fuel tanks 102 based on the operating state of the aircraft 90 (block 212). A OPP-FCV state change command is determined based on the over-pressure protection limit (block 214).

The more restrictive change command with the more closed state is selected from the two determinations (block 220). Based on the selection, a OPP-FCV command is determined (block 222). A command is sent to the valving unit (block 224) and the OPP-FCV 40 is adjusted (block 226).

The system 20 can include various OPP-FCV valves to control the flow of oxygen-depleted air along the supply line 104. FIGS. 3 and 6, 7, 8, and 9 disclose different examples.

Pneumatic OPP-FCV

FIG. 3 illustrates a OPP-FCV 40 embodied as a pneumatically actuated OPP-FCV that implements the system requirements. The OPP-FCV 40 is mounted to the supply line 104 and includes an upstream side 104*u* and a downstream side 104*d*. The OPP-FCV 40 includes an integrated pressure sense line 49 that extends between a line end portion 48 at the upstream side 104*u* of the supply line 104. The integrated pressure sense line 49 also includes a pressure sense inlet 47. In this example the OPP-FCV 40 is a pressure-loaded closed, spring-loaded closed poppet valve with a linear pressure regulating pneumatic actuator. Actuation pressure and resulting oxygen-depleted air flow is controlled by a reference regulator 33 and electrical mechanical interface devices 43, 44, 45. The valving unit 41 of the poppet valve is pressure-loaded closed (i.e., upstream facing) for better sealing when closed.

In order to maximize accuracy of over-pressure protection, the points of regulation are far downstream OPP-FCV close to the pressure being regulated for both OPP-FCV outlet pressure and (overpressure) actuator reference pressure. In some examples in which tolerances and precision requirements permit, one or both pressure sense point locations 75 or 75*a* (for actuator reference pressure) and 38*a* (for line pressure) are located near their respective valve seats for better packaging and more efficient assembly and test closer to the valving unit 41.

In normal operation, an upstream pilot valve 43 (solenoid valve) is energized open, a setpoint selector 44 is de-energized to select the (lower) overpressure setpoint, and a three-way proportional control servo valve 45 (a.k.a. "torque motor") is modulated to control actuation pressure. For the OPP-FCV 40 to fail closed in the event of loss of control signals, the servo valve 45 is spring-loaded to fully open to ambient pressure when a control signal is absent. As the valving unit 41 is both spring-loaded by one or more biasing elements 42 and pressure-loaded closed, opening occurs by the actuation pressure in the actuation chamber 46 being increased to overcome the preloaded forces. As the actuation pressure is further increased the force balance on the valving unit 41 determines the valve opening and resulting flow. When the servo valve 45 is fully open to the selected setpoint pressure, no further flow is passed and the OPP-FCV 40 smoothly transitions to over-pressure protection mode.

To control the flow of oxygen-depleted air, the OPP-FCV valve 40 operates with a separate closed loop control (not shown) and remote flow sensing element or sensing elements (not shown) to modulate the servo valve 45. The sensing elements and closed loop control provide the flow demand signal to the proportionally-controlled servo valve 45 that controls actuator pressure.

To control over-pressure, downstream supply line pressure is sensed through either a remote downstream pressure sense point via the pressure line 122 that enters through a port 125 in the body 81. The sensed pressure is ported to the feedback side of the pressure regulating pneumatic actuator. Optionally, downstream pressure is sensed through the downstream pressure sense point 38*a* with no pressure line or port.

The reference regulator 33 provides for the regulation setpoint to be selectable to accommodate the different flow rate requirements and supply line impedance. When the high setpoint is selected, much higher flow is passed by the OPP-FCV 40 due to non-zero line impedance. In some examples, the OPP-FCV 40 is sized so the valving unit 41 saturates full open after the maximum required flow rate is achieved, but before the need to control over-pressure. This sizing minimizes overlapping functionality and maximizes system analysis and test robustness.

In some examples, testing of the OPP-FCV 40 illustrated in FIG. 3 tests the operation of the regulating devices (Pilot Valve 43, Setpoint Selector 44, and Control Servo Valve 45), and tests the reference regulator 33 and/or biasing element 42 to detect drift in the overpressure set point.

The testing indicates that the OPP-FCV 40 has failed closed or there is an issue with flow if there is no flow or flow is lower than designed at any condition and the isolation valves 140 are commanded and indicating correct system configuration.

The OPP-FCV 40 can normally be closed by either of two regulating devices: the upstream pilot valve 43 can shut off flow when commanded closed, and the servo valve 45 shuts off flow when a flow demand signal is equal to zero. In some examples, both regulating devices are tested independently in sequential IBIT tests.

The setpoint selector 44 is verified to be healthy with one of several signals in a steady and ODADS load conditions, preferably with the isolation valves 140 closed. The preferred monitored signal is relative flow demand signal. When the high setpoint is selected, the relative servo valve flow demand signal will be more closed in normal closed loop control. Alternate signals which could be monitored include flow signal with the flow demand signal commanding full open, or a pressure sensing element could be included in the FRS system architecture to detect the shift in pressure regulation setpoint directly.

FIG. 3 illustrates one example of a OPP-FCV 40. In other examples, the OPP-FCV 40 includes a four-way servo valve instead of three-way servo valve. With a four-way servo valve, the "flow demand" signal becomes a nominal "flow error" control signal from the closed loop control. In some examples, uncontrolled default states of the regulating devices may be different based on the safety and failure mode requirements for a specific airplane and valve design. In some examples, the ratio of the actuation and feedback pistons of the pressure regulating pneumatic actuator may be greater than, equal to, or less than one, depending on pressures available and performance requirements. FIG. 3 depicts an actuator with a ~1:1 area ratio (except for the guide & balancing land) for architectural simplicity.

Single Channel Electrical Control

Figure 6:
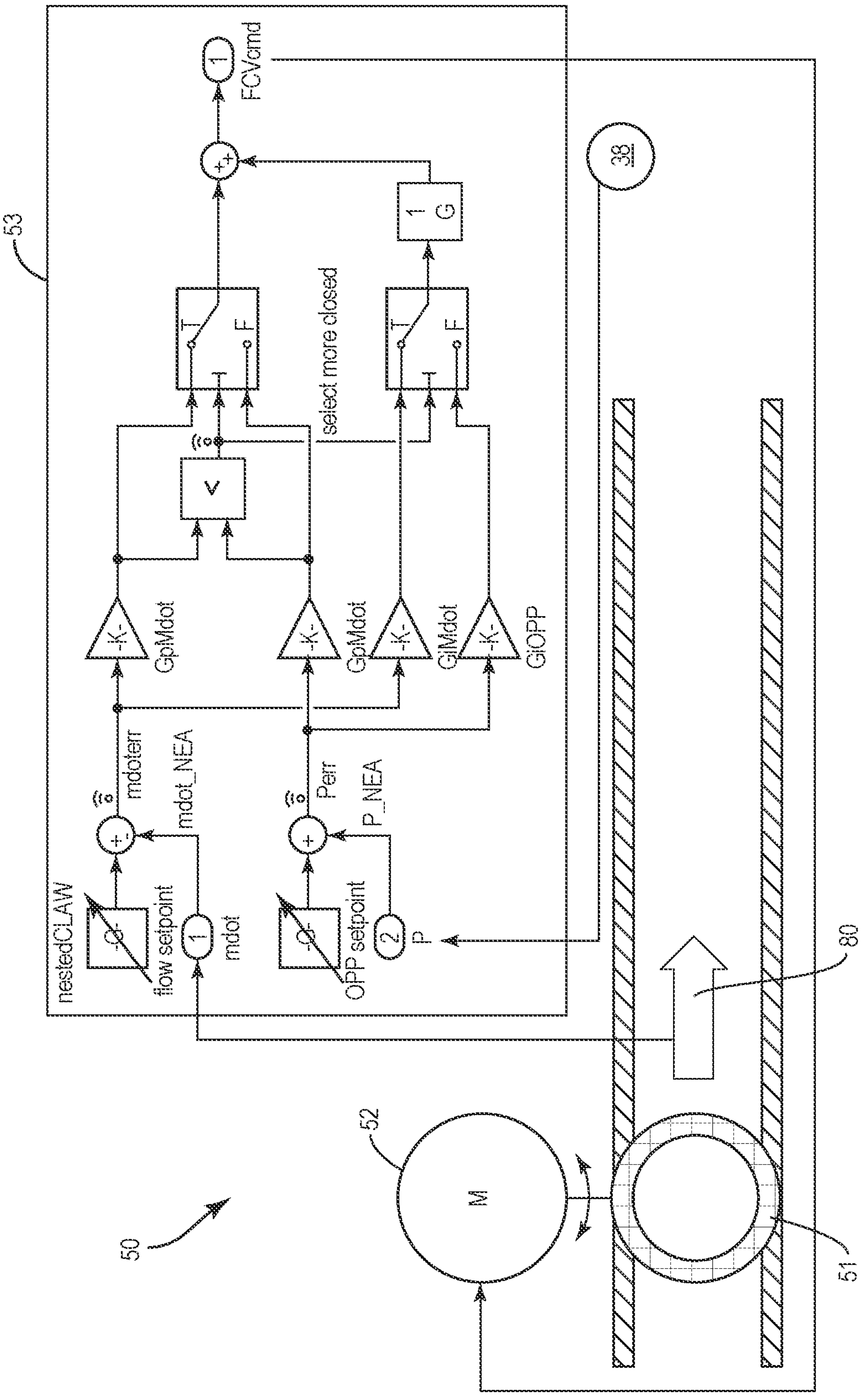
FIG. 6 is a schematic diagram of a single channel regulating OPP-FCV.

FIG. 6 illustrates an example of a OPP-FCV 50 having a valving unit 51 configured to be mounted along the supply line 104. A motor 52 is operatively connected to and controls the positioning of the valving unit 51. In some examples, a direct drive shaft or a gear train extends between the motor 52 and the valving unit 51. In some examples, the motor 52 includes an integrated brake or very low backdrive efficiency gear train.

A motor controller 53 controls the operation of the motor 52. The motor controller 53 includes a P+I (proportional+integral) single position closed loop control which smoothly selects the more closed command of nested flow and pressure proportional commands illustrated as the "nested-CLAW". In some examples, the control is a fully-integrated very "Smart OPP-FCV" unit with effector, control law, and oxygen-depleted air flow and pressure sensing elements in a single package, a system where the sensing elements and "nestedCLAW" are fully distributed across multiple federated units and hosted applications, or various combinations.

In normal operation, the motor 52 is commanded to position the valving unit 51 closed at power-up (i.e., both command setpoints set to 0), and the integrator is reset to a closed command. In some examples the power-up state is held sufficiently long for the valving unit 51 to actually close. As the normal operation state is entered, the flow setpoint is set based on flight phase, altitude, and other airplane operating states, and the over-pressure protection setpoint is set to a value that protects airplane structure. This causes the FCVcmd to command the motor 52 to position the valving unit 51 open to the position where mdoterr equals zero in steady-state. As Perr will still be positive at this steady-state condition, mdoterr will be selected by the "<" relational test, which will select the zero input to the integrator (0=mdoterr*GiMdot in steady-state) and hold the position, until sensed actual flow is no longer equal to flow setpoint.

To control oxygen-depleted air flow, the OPP-FCV 50 includes one or more integrated mass flow sensing elements 80. A signal is generated for closed loop control. The oxygen-depleted air flow signal is processed through a P+I control law so that actual flow equals flow setpoint subject to system physics and nested CLAW saturations. The flow control CLAW parameters GpMdot and GiMdot are tuned to optimize dynamic effects such as response time and overshoot.

To control over-pressure, downstream supply line pressure (illustrated as "P" in FIG. 6) is sensed through either a remote downstream pressure sensing element or optionally a port within the body of the OPP-FCV 50. The sensed pressure is consumed by a closed loop control for which the command OPP setpoint is selectable.

The regulation setpoint is selectable to accommodate the different flow rate requirements and supply line impedance. When the high setpoint is selected, much higher flow is passed due to non-zero line impedance. In some examples, the OPP-FCV 50 is sized to saturate full open after the maximum required flow rate is achieved, but before the OPP-FCV 50 is required to control over-pressure. Such a sizing will minimize overlapping functionality and maximize system analysis and test robustness.

A feature of OPP-FCV 50 is a smooth transition between flow control and over-pressure control. The architecture of this single channel system allows the OPP-FCV command to transition smoothly between flow control and over-pressure closed loop control modes, but with discrete slope change. The proportional contribution to FCMcmd transitions smoothly when the "<" relational test changes, and while the corresponding integrator input will almost always have step change, a change in an integrator input results in only a slope change in the output.

In some examples, in the event of a loss of electric power the motor 52 either maintains the position of the valving unit 51 or moves to a position resulting from the flow forces and environmental influences such as vibration. More precise control of the unpowered OPP-FCV position could be achieved with sufficient holdup time energy to position the valving unit.

Testing of OPP-FCV 50 is characterized in a suite of CBIT and automatic IBIT tests. Since both mdoterr and Perr in the nested CLAW are in a P+I control with the shared integrator, if there is sufficient air supply then a steady-state condition where neither signal is zero is anomalous, and is indicative of a fault in the system. For example, in normal operation the system is on flow control and mdoterr=0, whereas in the deadheaded operation failure mode and flow is low, Perr=0 in steady-state when the OPP-FCV 50 is performing overpressure protection.

In some examples, the OPP-FCV 50 has a position sensing element to detect the position of the valving unit 51 for improved system performance and direct health monitoring.

Failed closed/low flow testing, including low flow and erroneously closed conditions, are detectible with pressure sensing element readings and known performance of the overall ODADS system 100. Oxygen-depleted air flow and downstream pressure is mapped as functions of valve position and supply conditions to determine system health. If the system is low flow steady-state, the pressure term is useful for isolating downstream blockage from the OPP-FCV 50 being more restrictive than required (again, assuming sufficient oxygen-depleted air inlet supply).

High flow and erroneously open conditions are detectible with a map algorithm similar to low flow detection and fault isolation. In addition, the sensing elements are tested for bias shift when there is no air supply by comparing to ambient pressure and known zero flow.

An IBIT procedure is used to verify overpressure protection is operational as part of a pre-flight or post-flight test. For the testing, mdot setpoint is set to an abnormally high value, and one or more isolation valves 140 are closed as required. The OPP-FCV 50 will then regulate pressure at the overpressure protection setpoint value. If desired, overpressure protection setpoint could also be lowered for the test.

In some examples, the motor actuator command FCVcmd is either analog or digital depending on the motor technology and processing ability of the motor 52.

In some examples, the valving unit 51 is a ball valve. In other examples, the valving unit 51 is a rotary valving unit such as a butterfly or plug valve. In some examples, the system concepts are readily extended to linear valves such as globe valves or poppet valves when used with a motor actuator with a linear output.

In some examples, FCVcmd is linear current, linear voltage, hysteretic control, or a pulse modulation technique.

Figure 7:
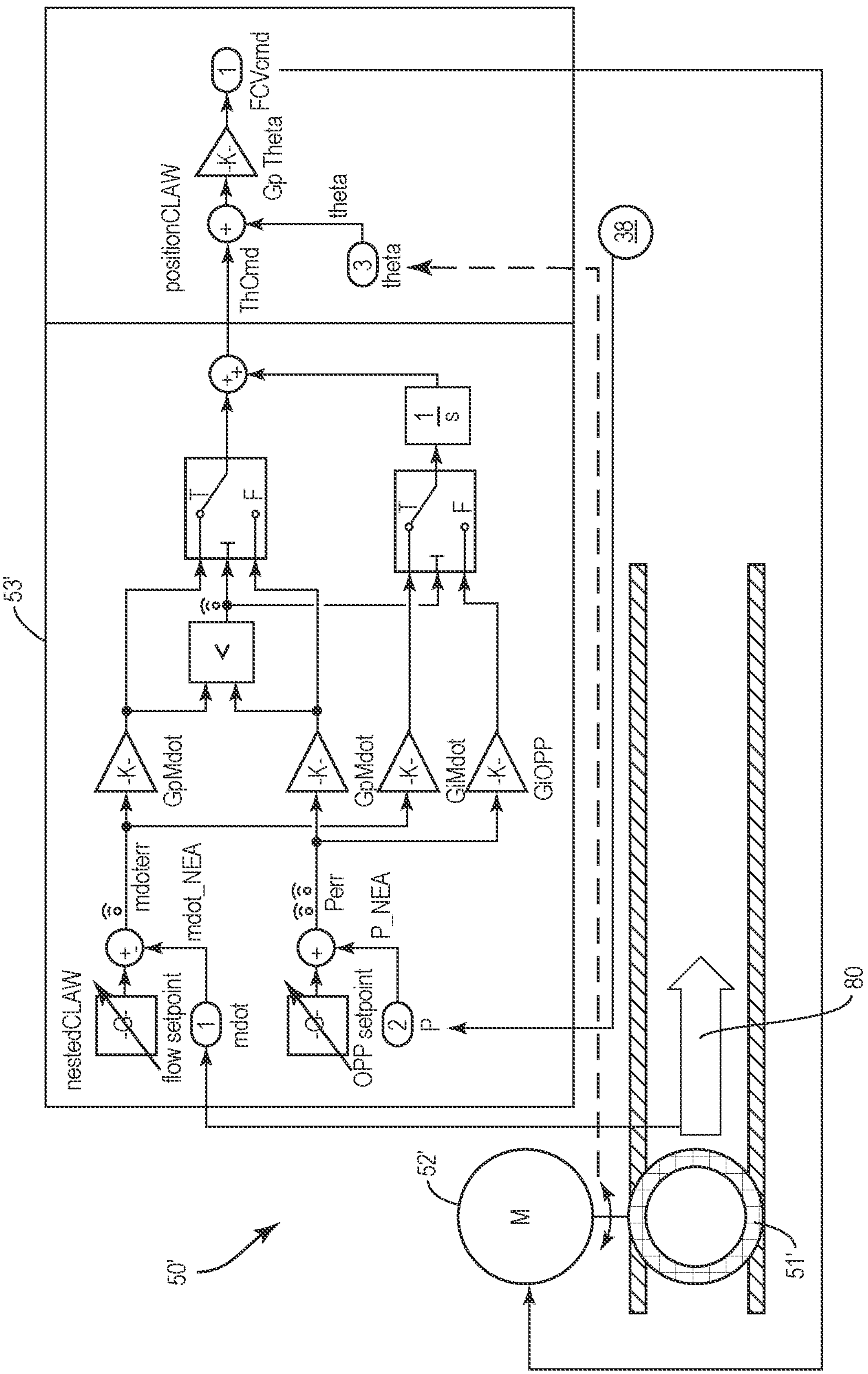
FIG. 7 is a schematic diagram of a single channel electrically controlled OPP-FCV with inner position loop.

In a similar OPP-FCV 50' illustrated in FIG. 7, the single channel electrically-controlled motor controller 53' includes an inner position control loop to improve system stability and response time. The current motor position is received at theta, and proportionally combined with the flow/overpressure valve command. In other examples, the FCVcmd may be a proportional or pulse modulation command, depending on the motor technology and other considerations.

In some examples, the motor controller includes other CLAW features such as derivative control or compensation.

In some examples, the motor controller includes a latching feature for over-pressure protection. In some examples, the latching feature is resettable from a command external to the system. In some examples, the latching feature replaces the pressure control element of the nestedCLAW, as an outer loop at another higher overpressure protection setpoint.

In some examples, the motor controller includes redundant electric shutoff control. Normal options include none with current return through the controller, motor power supply switching from a power panel with command external to the OPP-FCV, or if the OPP-FCV is "smart" but with a remote controller, then the semi-smart OPP-FCV would normally have a separate airplane-level power supply.

In some examples, the motor controller reconfigures when sensing element signals are lost and when a redundant sensing element is invalidated. Depending on safety and availability requirements this reconfiguration could be taking the related nested CLAW out of the control, controlling the valving unit to a specific position, system shutdown, or reconfiguration options.

In some examples, the OPP-FCV includes features to control the position of the valving unit when electric power is not available. For example, a windup spring on the shaft could bias the valving unit to go closed in case of loss of power.

Dual Dissimilar Channel Electrically Controlled with Dual Actuation

Figure 8:
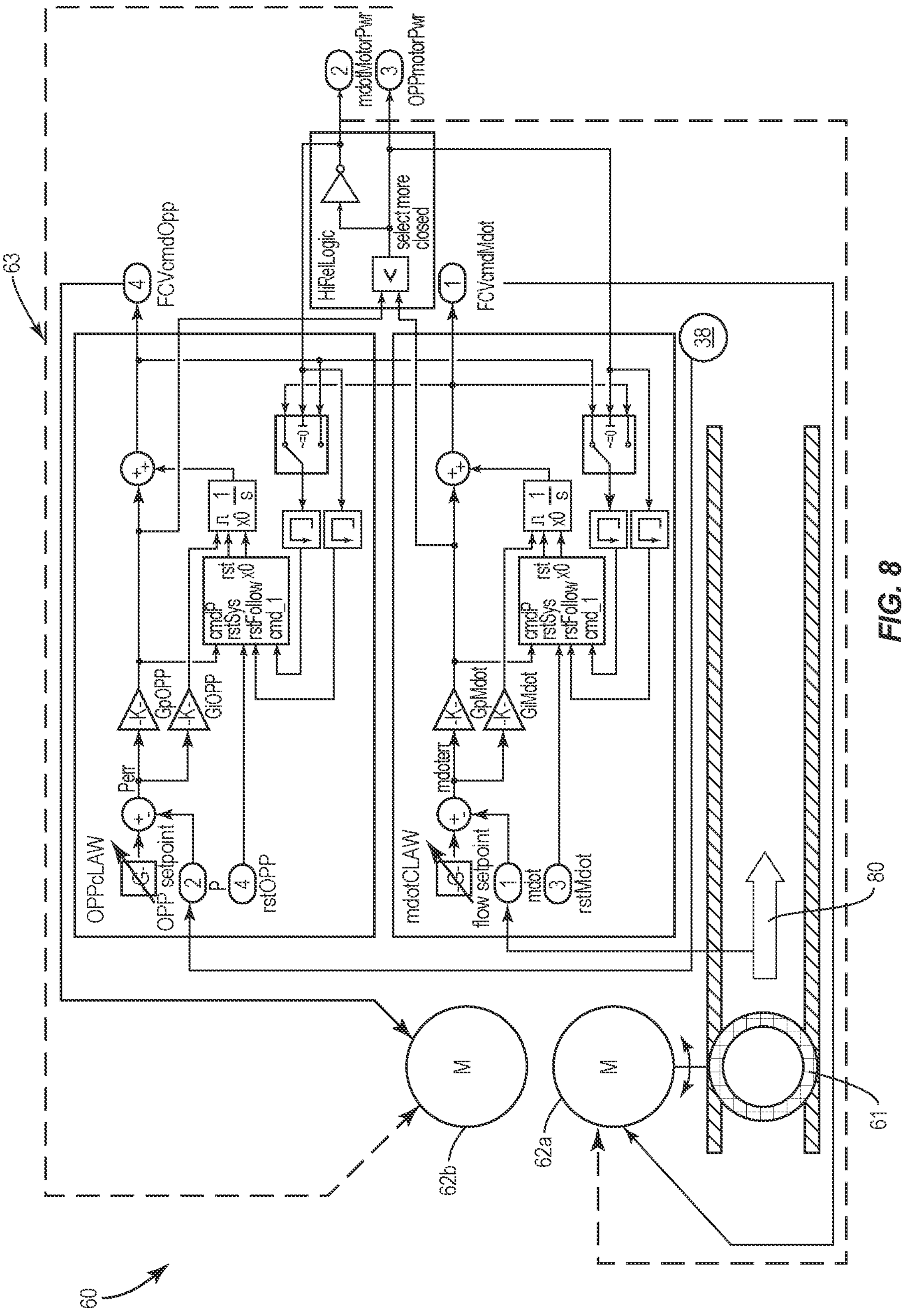
FIG. 8 is a schematic diagram of a dual dissimilar channel electrically controlled OPP-FCV with dual actuation.

FIG. 8 is OPP-FCV 60 having dual dissimilar channel electrical control with dual valve actuation. The OPP-FCV 60 is a rotary servomotor-driven ball valve with electrical isolated P+I closed loop controls for oxygen-depleted air flow control and over-pressure protection. In some examples, a gear train extends between the motors 62*a*, 62*b* and valving unit 61.

Separate motors 62*a*, 62*b* for each channel enables electrical isolation. Smooth transition between the two sets of controls to select the more closed command is enabled by simple high reliability non-programmable logic as illustrated by HiRelLogic. In some examples, the motors include an integrated brake or very low backdrive efficiency geartrain. In some examples, a no-back feature is included when FCVcmd is some form of pulse modulation.

In some examples, the OPP-FCV 60 is configured in a single package with effector, control laws, and one or more integrated flow sensing elements and pressure sensing elements (not illustrated). In some examples, the OPP-FCV 60 includes sensing elements and controls that are fully distributed across multiple units and hosted applications, or any of many combinations between the two.

In normal operation, the valving unit 61 is commanded closed at power-up by initializing the low control law mdotCLAW to 0 (i.e., flow setpoint set to 0), and the mdotCLAW integrator is reset to 0. The over-pressure protection setpoint OPP setpoint in OPPcLAW is set as required by the specific design and system safety requirements, and the OPPCLAW integrator is set for a smooth initialization based on Perr.

As the normal operation state is entered, both the flow setpoint and OPP setpoint are set based on flight phase, altitude, and other airplane operating states. This IC condition causes the HiRelLogic to enable the flow control motor actuator and FCVcmdMdot to command the valving unit 61 to the position where mdoterr equals zero in steady-state. In this steady-state Perr is positive (i.e., Perr>(mdoterr=0)), so the HiRelLogic does not enable the over-pressure protection motor actuator and FCVcmdOpp is irrelevant.

To control oxygen-depleted air flow, the OPP-FCV 60 includes one or more flow sensing elements (show by the arrow in FIG. 8). The flow signal is processed through a P+I control law so that actual flow equals flow setpoint, subject to system physics and mdotCLAW saturations. The flow control CLAW parameters GpMdot and GiMdot are tuned to optimize dynamic effects such as response time and overshoot.

To control over-pressure, downstream oxygen-depleted air pressure (illustrated as "P" in FIG. 8) is sensed through either a remote downstream pressure sensing element 38, or optionally a port within the body of the OPP-FCV 60. The sensed pressure is consumed by a closed loop control, for which the command over-pressure protection setpoint is selectable.

The flow regulation setpoint is selectable to accommodate the different flow rate requirements and supply line impedance. When the high setpoint is selected, much higher flow is passed due to non-zero line impedance. In one example, the OPP-FCV 60 saturates full open after the maximum required flow rate is achieved, but before the protection of over-pressure. Such a sizing minimizes overlapping functionality and maximizes system analysis and test robustness.

A smooth transition between flow control and over-pressure control is implemented in the controls with very limited information sharing between the two control laws mdotCLAW and OPPCLAW, and the very simple high reliability logic HiRelLogic. The high reliability logic is a simple comparator "<" which selects the more closed proportional command between mdoterr*GpMdot and Perr*GpOPP. Based on this comparator, each control law independently determines if it is in control of the OPP-FCV 60 and if it is, processes the integral command and total P+I command to the energized motor actuator. The control law which is not in control just follows the other channel's integral command so that when control switches based on the high reliability comparator, both integrators output the same value. At the time control switches both P+I CLAWs compute the same command, and the transition is smooth. The proportional commands are equal, as that is the switching criteria, and the integral commands are equal as one integrator is always matching the other.

Multi-channel control includes some comingling of physics and control signals. In one example, the discrete comparator in the simple high reliability logic has integrity comparable to the shaft in the OPP-FCV 60 and is fully BIT-able. The few shared signals from the relatively more complex controls are validated before being consumed by the controls.

In the event of a loss of electric power on one channel, the other channel reconfigures as determined to be best for the aircraft 90, and the high reliability logic selects the powered control loop. The OPP-FCV 60 either stays in place or at a position resulting from the flow forces and environmental influences such as vibration. More precise control of the unpowered valving unit 61 position could be achieved with sufficient holdup time energy to position the valving unit 61, or by inclusion of some of the features disclosed above such as but not limited to various types of valves.

The safety functionality and health of the dual channel OPP-FCV 60 is characterized in a suite of CBIT and automatic IBIT tests. In general, the test conditions should be in steady altitude conditions with steady supply pressure and temperature and fixed configurations of the isolation valves 140. Test entry should be confirmed based on sufficient air supply pressure and temperature being available.

When operating normally with sufficient supply pressure, either mdoterr or Perr will be zero in steady-state, depending on which proportional command in their respective P+I CLAWs is commanding more closed. For example, in normal operation the system will be on flow control and mdoterr=0, whereas in the deadheaded operation failure mode and flow is low, Perr=0 in steady-state when the OPP-FCV 60 is performing overpressure protection.

The two signals that are shared between the OPP and mdot control channels in this control architecture are validated against reasonable performance maps, or validated by independently reading and processing the other channel's sensing element signals and applying a proportional subset of the other channel's CLAW.

In some examples, the OPP-FCV 60 has a position sensing element to detect the position of the valving unit 61 for improved system performance and direct health monitoring.

As automatic IBITs require some coordination between the two control channels, there is supervisory control from an external airplane system. In some examples, this type of supervisory control is implemented in the DCA in legacy aircraft, or other different systems in newer aircraft.

Low flow and erroneously closed conditions are detectible with CBIT using flow sensing elements 80, 114, & 124 and pressure sensing elements 38, 112, & 112*a* in the FRS architecture, knowing expected FRS performance. Oxygen-depleted air flow and downstream pressure are mapped as functions of the position of the OPP-FCV 60 and supply conditions to determine system health. If the system is low flow steady-state, the pressure term is useful for isolating downstream blockage from the OPP-FCV 60 being more restrictive than required (again, assuming sufficient oxygen-depleted air inlet supply).

High flow and erroneously open conditions are detectible with a map algorithm similar to low flow detection and fault isolation. In addition, the FCV-OPP sensing elements are tested for bias shift when there is no air supply by comparing to ambient pressure and known zero flow.

An IBIT procedure used to verify overpressure protection is operational as part of a pre-flight test, post-flight test, and stable condition in-flight tests. For the IBIT procedure, mdot setpoint is set to an abnormally high value, and one or more isolation valves 140 is closed as required. The protection system 20 will then regulate pressure at the over-pressure protection setpoint value. If desired, the over-pressure protection setpoint could also be lowered for the BIT test.

In order to completely eliminate all latency, if necessary automatic IBIT can test the high reliability logic by intercepting the commands for each channel and driving the logic directly.

The motor actuator commands may be either analog or digital, depending on the motor technology. In some examples, the valving unit 61 is a ball valve. In other examples, the valving unit 61 includes other rotary valving units such as butterfly or plug valves. Further, the electrically controlled system concepts are readily extended to systems with linear valving units such as globe valves or poppet valves, if used with a motor actuator with a linear output.

In some examples, FCVcmdMdot and FCVcmdOpp are linear current, linear voltage, hysteretic control, or some pulse modulation technique. The two motor actuator commands may be the same or different types.

Figure 9:
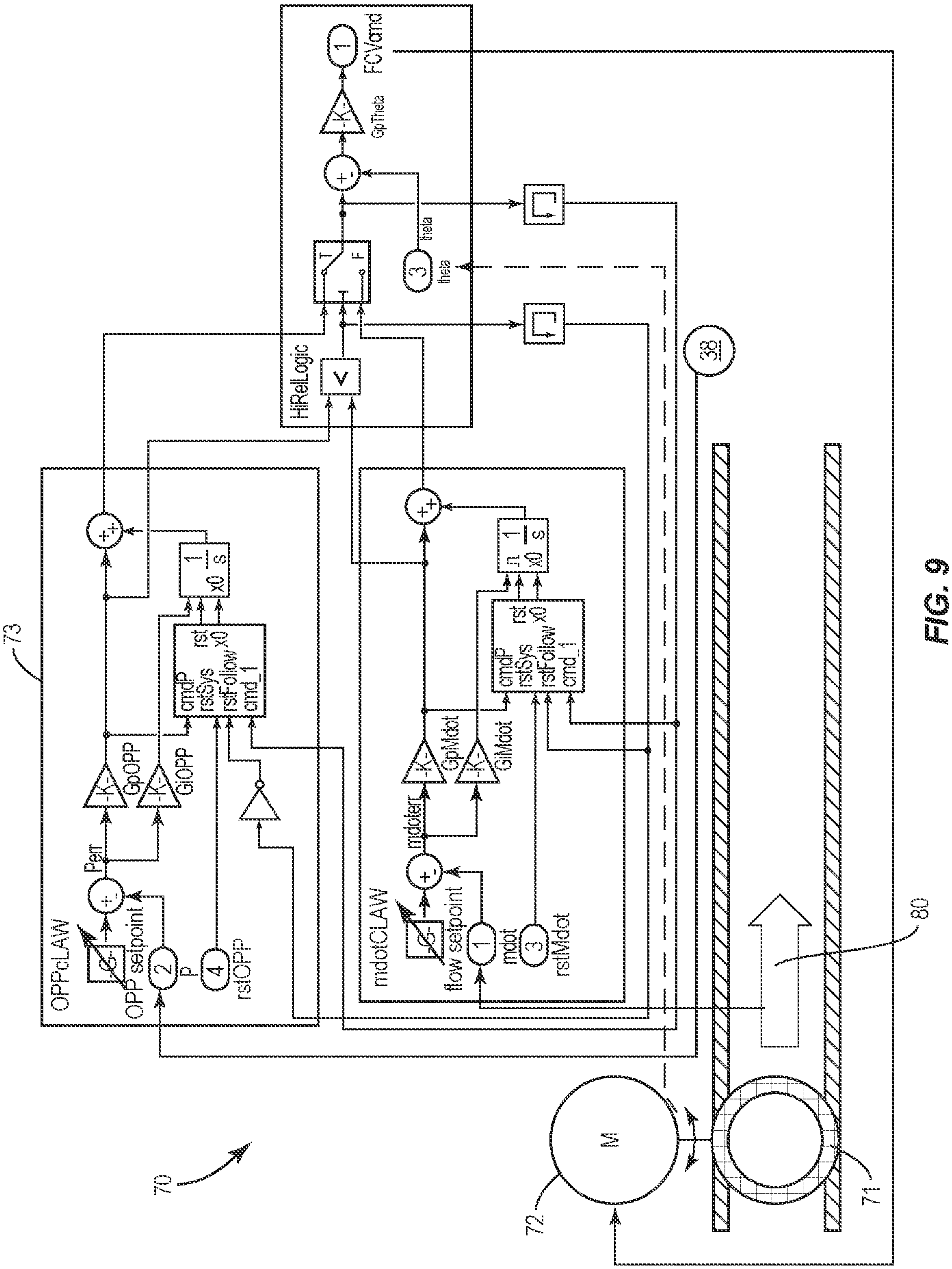
FIG. 9 is a schematic diagram of a dual dissimilar electrically controlled OPP-FCV with inner position loop.

In some examples, each control channel has an inner position control loop. Further, by treating the motor controller 63 as prime reliable, a OPP-FCV 70 can be dual channel electrically controlled and includes an inner position control loop such as shown in FIG. 9 to improve system stability and response time. As with the basic control concept described earlier, the FCVcmd may be a proportional or pulse modulation command, depending on the motor technology and other considerations. In some examples, the three control subsystems, mdotCLAW, OPPcLAW, and HiRelLogic, are physically architected in 1, 2, or 3 different LRUs where the HiRelLogic is functionally allocated to a "smart" valve while the two control laws are allocated to hosted apps in an IMA. In some examples, the control subsystems are co-housed in a "smart" OPP-FCV, or other physical architectures.

In some examples, the electrically controlled protection system 20 includes a latching feature for over-pressure protection, possibly resettable from a command external to the system. In some examples, the latching feature replaces the pressure control element of the OPPCLAW as an outer loop at another higher OPP setpoint.

In some examples, the control laws reconfigure when sensing element signals are lost and/or when a redundant sensing element is invalidated. In some examples, this reconfiguration takes the related nested CLAW out of the control, controlling the valving unit to a specific position, system shutdown, or reconfiguration options.

In some examples of FIGS. 8 and 9, the electrically controlled protection system 20 includes features to control the position of the OPP-FCVs 60, 70 when electric power is not available. For example, a windup spring on the shaft could bias the valving unit to go closed in loss of power.

In addition to the system 20 disclosed above, an additional level of detection is achieved by adding fuel level sensing in the surge tanks 94. In case of overpressure, as the pressure raises in the fuel tank 102, fuel is pushed out into the surge tanks 94. When fuel within a surge tank 94 reaches a set threshold, the FRS 99 is directed to shut down. Since fuel normally can get into the surge tanks 94 (and flow back into the fuel tanks 102), the set threshold is higher than the normal expected level to reduce/prevent the risk of nuisance messages.

In some examples, fuel level sensing in one or more of the surge tanks 94 is performed with the pressure in the ODADS 100. In some examples, surge tank testing is a secondary means to monitor the fueling system. This is because the pressure in the fuel tank raises first before the fuel level would be sensed in the surge tank 94. This causes the fuel sensing to lag in reacting to over-pressure (compared to the architectures that react to the pressure in the ODADS or in-tank pressure).

A controller 150 oversees and controls the operation of the system 20. The controller 150 can be integrated with the OPP-FCV 40 or can be positioned remotely from the OPP-FCV 40. In some examples, the controller 150 is independent and functions to just control the operation of the OPP-FCV 40. In other examples, the controller 150 is part of one or more other systems on the aircraft 90.

Figure 10:
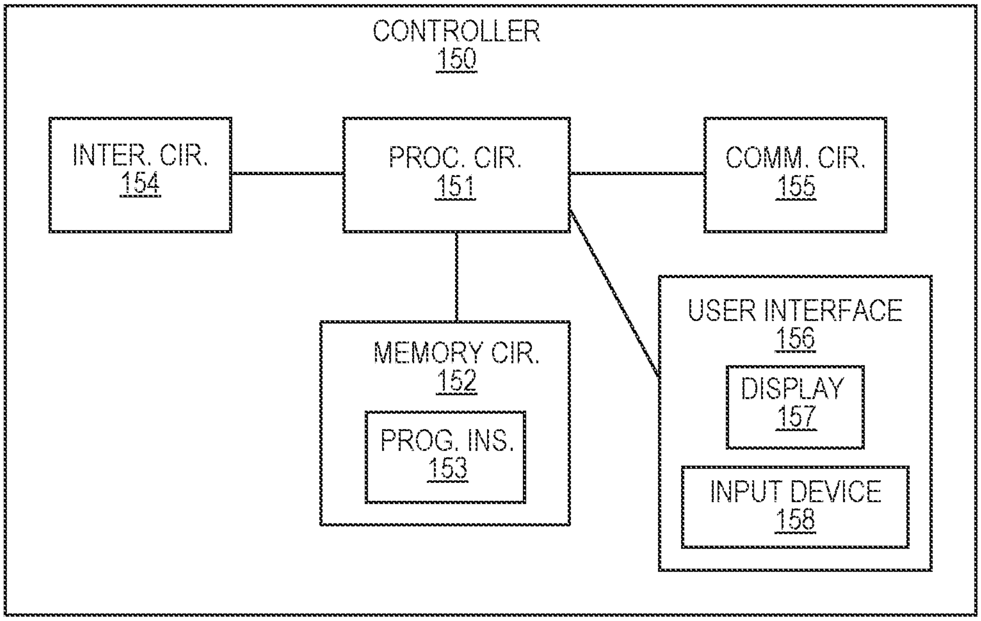
FIG. 10 is a schematic diagram of a controller that controls the operation of the OPP-FCV and/or flow regulation and protection system.

FIG. 10 illustrates a controller 150 that includes processing circuitry 151 that operates according to program instructions 153 stored in memory circuitry 152. The processing circuitry 151 includes one or more circuits, microcontrollers, microprocessors, hardware, or a combination thereof. The processing circuitry 151 can include various amounts of computing power to provide for the needed functionality.

Memory circuitry 152 includes a non-transitory computer readable storage medium storing program instructions 153, such as a computer program product, that configures the processing circuitry 151 to implement one or more of the techniques discussed herein. Memory circuitry 152 can include various memory devices such as, for example, read-only memory, and flash memory. Memory circuitry 152 can be a separate component as illustrated in FIG. 10 or can be incorporated with the processing circuitry 151. Alternatively, the processing circuitry 151 can omit the memory circuitry 152, e.g., according to at least some embodiments in which the processing circuitry 151 is dedicated and non-programmable (e.g., hardware-implemented state machine).

Interface circuitry 154 provides for sending and/or receiving signals from one or more of the components of the system (e.g., atmospheric pressure sensing elements 37, line pressure sensing elements 38, mass flow sensing elements 80). Interface circuitry 154 also provides for communications with other systems onboard the aircraft 90, such as through the communications bus 160. The interface circuitry 154 can provide for one-way communications or two-way communications.

Communication circuitry 155 provides for communications to and from the controller 150 with a remote node (e.g., monitoring center, server, database). Communications circuitry 155 provides for sending and receiving data with one or more remote nodes. Communications circuitry 155 may include wired and/or wireless interfaces.

A user interface 156 enables a user to control one or more aspects of the OPP-FCV 40 and/or system 20 during operation. The user interface 156 includes one or more input devices 158 such as but not limited to a keypad, touchpad, roller ball, and joystick. The user interface 156 also includes one or more displays 157 for displaying information regarding the testing and/or for an operator to enter commands to the processing circuitry 151.

The system provides significant savings in the fuel tank over-pressure analysis non-recurring costs, reduces certification risks compared to the architectures that limit inert air into the fuel tank based on failure conditions and or have vent architectures that increase design space where limitations are needed (flights with covered main and/or center tank climb port), and reduces confined space work and software complexity compared to the systems that use in-tank components.

Figure 11:
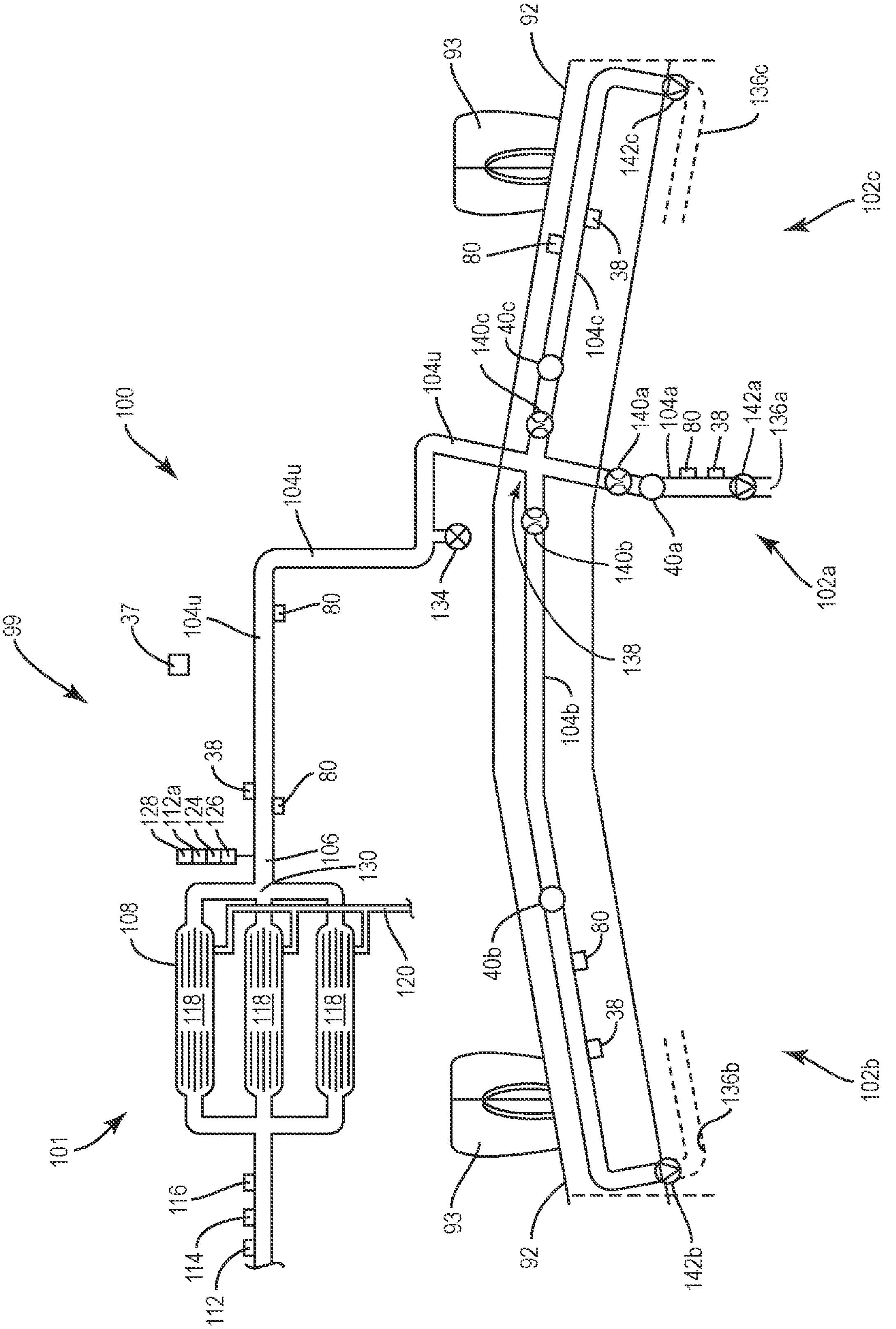
FIG. 11 is a schematic diagram of an oxygen-depleted air distribution system for fuel tanks with OPP-FCVs positioned along each of the branch lines.

In some examples as illustrated in FIG. 11, separate OPP-FCVs 40*a*, 40*b*, 40*c* are positioned in the branch lines 104*a*, 104*b*, 104*c* that lead into the respective fuel tanks 102*a*, 102*b*, 102*c*. Each separate OPP-FCV valve 40*a*, 40*b*, 40*c* is configured to control the flow of oxygen-depleted air into the respective fuel tank and to prevent overpressurization. In some examples, the separate OPP-FCVs 40*a*, 40*b*, 40*c* are used in a system without an OPP-FCV 40 (i.e., main OPP-FCV) located along the supply line 104 upstream from the junction 138. In other examples, the separate OPP-FCVs 40*a*, 40*b*, 40*c* are used in combination with the main OPP-FCV 40.

As stated above, the disclosure is directed to controlling the supply of oxygen-depleted air to the fuel tanks 102 of an aircraft 90 and preventing overpressurization of the fuel tanks 102. The oxygen-depleted air can include various configurations including but not limited to nitrogen, argon, and carbon dioxide.

It should be understood that although the systems 20 shown and described herein for use with a ODADS 100 that serves more than one fuel tank 102, the systems 20 disclosed herein are equally applicable to ODADS 100 that serve only a single fuel tank 102. In other words, in some examples, the system 20 is used to detect overpressure scenarios in only a single fuel tank 102.

The flow regulation and protection system can be used in a variety of different distribution systems. One example is in an oxygen-depleted air distribution system (ODAS). A specific example of a distribution system is a nitrogen enriched air distribution system (NEADS).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A flow regulation and protection system configured to be coupled in fluid communication with a supply line of an oxygen-depleted air system that supplies oxygen-depleted air to a fuel tank of an aircraft, the flow regulation and protection system comprising:

an over-pressure protection-flow control valve (OPP-FCV) configured to be coupled in fluid communication with the supply line of the oxygen-depleted air system at a point along the supply line upstream from the fuel tank, the OPP-FCV comprising:

a body;

a conduit that extends through the body and comprises an upstream side and a downstream side each configured to connect to the supply line;

a pressure sense line within the body that is separate from the conduit, the pressure sense line comprising a first end at the conduit and a second end away from the conduit;

wherein the OPP-FCV is selectively adjustable to regulate a flow of the oxygen-depleted air through the supply line and supplied to the fuel tank and to restrict or prevent the flow of the oxygen-depleted air along the supply line to prevent over pressurization of the fuel tank.

2. The system of claim 1, wherein the OPP-FCV is configured to control the flow of the oxygen-depleted air in the supply line without venting the oxygen-depleted air from the supply line.

3. The system of claim 1, wherein the OPP-FCV is configured to regulate the flow of the oxygen-depleted air based on a difference between an atmospheric pressure and a supply line pressure upstream from the fuel tank.

4. The system of claim 3, wherein the pressure sense line is a first pressure sense line and further comprising a second pressure sense line configured to be coupled in fluid communication with the supply line at a pressure sense point located along the supply line between the OPP-FCV and the fuel tank, the second pressure sense line being coupled in fluid communication with the OPP-FCV such that the OPP-FCV is configured to sense the supply line pressure downstream from the OPP-FCV.

5. The system of claim 1, wherein the OPP-FCV comprises an integrated pressure sense point within the body and that is configured to be coupled in fluid communication with the conduit within the OPP-FCV and configured to sense supply line pressure downstream of an OPP-FCV seat.

6. The system of claim 1, further comprising:

one or more atmospheric pressure sensing elements configured to sense an atmospheric pressure;

one or more line pressure sensing elements configured to sense a pressure within the supply line; and one or more mass flow sensing elements configured to sense a flow rate of the oxygen-depleted air within the supply line.

7. The system of claim 1, and further comprising a controller comprising processing circuitry and configured to receive inputs comprising a supply line pressure at one or more points along the supply line, an atmospheric pressure, a mass flow rate of the oxygen-depleted air at one or more points along the supply line, and an operating state of the aircraft, the controller configured to adjust the OPP-FCV based on the inputs.

8. The system of claim 7, wherein the controller is configured to receive one or more of the inputs from the aircraft through a communications bus of the aircraft.

9. The system of claim 7, wherein the controller is configured to perform testing of the system when the aircraft is in one of a plurality of predetermined operating states.

10. A flow regulation and protection system configured to be coupled in fluid communication with a supply line of an Oxygen-Depleted Air Distribution System (ODAS) that supplies oxygen-depleted air to a fuel tank of an aircraft, the flow regulation and protection system comprising:

an over-pressure protection-flow control valve (OPP-FCV) configured to be coupled in fluid communication with the supply line at a point upstream from the fuel tank, the OPP-FCV comprising:

a body;

a conduit that extends through the body and configured to be mounted to the supply line;

a reference regulator integrated in the body, the reference regulator configured to provide a regulation setpoint;

a valving unit integrated in the body and configured to adjust a flow of the oxygen-depleted air along the conduit;

a line pressure sensing element located in the supply line downstream from the OPP-FCV;

a controller comprising processing circuitry configured to determine inputs comprising a supply line pressure sensed by the line pressure sensing element at one or more points along the supply line, an atmospheric pressure, a mass flow rate of the oxygen-depleted air at one or more points along the supply line, and an operating state of the aircraft; and the controller configured to adjust the valving unit based on the inputs to control the flow of the oxygen-depleted air through the supply line and prevent over pressurization of the fuel tank.

11. The system of claim 10, wherein the controller is integrated in the body.

12. The system of claim 11, further comprising a pressure sense line integrated with the body and configured to be coupled in fluid communication with the conduit, the controller configured to sense the supply line pressure at the OPP-FCV through the integrated pressure sense line.

13. The system of claim 12, further comprising one or more line pressure sensing elements mounted to the body.

14. The system of claim 10, wherein the controller is configured to determine a difference between the supply line pressure and the atmospheric pressure.

15. The system of claim 10, wherein the fuel tank is a first fuel tank and the OPP-FCV is configured to be mounted along the supply line upstream from a junction of the supply line that supplies the oxygen-depleted air to the fuel tank and one or more additional fuel tanks and wherein the controller is configured to adjust the valving unit based on the inputs to control the flow of the oxygen-depleted air to each of the fuel tanks and to prevent over pressurization of each of the fuel tanks.

16. The system of claim 10, wherein the controller is configured to receive one or more of the inputs from the aircraft through a communications bus of the aircraft and compute the mass flow rate and an overpressure set point based on the one or more inputs.

17. The system of claim 10, wherein the controller is configured to perform testing of the system when the aircraft is in one of a plurality of predetermined operating states and report test results through a communications bus to the aircraft.

18. A method of regulating a flow of oxygen-depleted air from an oxygen-depleted air distribution system to a fuel tank of an aircraft and to prevent over-pressurizing the fuel tank, the method comprising:

coupling an over-pressure protection-flow control valve (OPP-FCV) in fluid communication with a supply line of the oxygen-depleted air distribution system at a point along the supply line that is upstream from the fuel tank;

moving the oxygen-depleted air through a pressure sense line and a conduit that extend within a body of the OPP-FCV:

adjusting a valving unit integrated in the body of the OPP-FCV based on the oxygen-depleted air that moves through the pressure sense line and the conduit and controlling a flow rate of the oxygen-depleted air moving along the supply line; and operating the OPP-FCV and preventing a pressure within the fuel tank from exceeding an over-pressure protection limit.

19. The method of claim 18, further comprising operating the OPP-FCV without venting the oxygen-depleted air.

20. The method of claim 18, further comprising closing the OPP-FCV and preventing the oxygen-depleted air from passing along the supply line.

* * * * *